(12) United States Patent
Ionescu

(10) Patent No.: US 7,041,348 B2
(45) Date of Patent: May 9, 2006

(54) LIQUID CRYSTALLINE MEDIUM AND LIQUID CRYSTAL DISPLAY

(75) Inventor: Doina Ionescu, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/680,415

(22) Filed: Oct. 8, 2003

(65) Prior Publication Data

US 2005/0041197 A1    Feb. 24, 2005

(30) Foreign Application Priority Data

Oct. 8, 2002    (EP) .................................. 02022328

(51) Int. Cl.
*C09K 19/36*    (2006.01)
*G02F 1/13*    (2006.01)

(52) U.S. Cl. .................... 428/1.3; 252/299.7; 349/123; 349/125; 349/127; 349/128

(58) Field of Classification Search ............. 252/299.7; 428/1.3; 349/123, 125, 127, 128
See application file for complete search history.

(56) References Cited

U.S. PATENT DOCUMENTS

| 4,818,076 A | 4/1989 | Heppke et al. |
| 4,917,475 A | 4/1990 | Meyer et al. |
| 4,988,458 A | 1/1991 | Heppke et al. |

FOREIGN PATENT DOCUMENTS

| GB | 2 356 629 | 5/2001 |
| GB | 2 387 603 | 10/2003 |

OTHER PUBLICATIONS

Coles et al., "The effect of the molecular structure on flexoelectric coupling in the chiral nematic phase", J. Mater. Chem., 2001, vol. 11, pp. 2709-2716.*
Blatch et al., "Symmetric and non-symmetric liquid crystal dimers with branched terminal alkyl chains: racemic and chiral", J. Mater. Chem., 1997, vol. 7(1), pp. 9-17.*
European Patent Abstract No. 0 971 016 Dated Jan. 12, 2000.
German Patent Abstract No. 101 12 769 Dated Dec. 20, 2001.
European Patent Abstract No. 0 281 341 Dated Sep. 7, 1988.

* cited by examiner

*Primary Examiner*—Shean C. Wu
(74) *Attorney, Agent, or Firm*—Millen, White, Zelano, Branigan, P.C.

(57) ABSTRACT

The instant invention relates to liquid crystal displays of the flexoelectric type operating in the uniformly lying helix mode and in particular to the orientation of the cholesteric liquid crystalline media, which have a short pitch, in these displays by making the system non-symmetric. The media comprise a bimesogenic component, component A and a chiral component, component B. The display comprises one substrate on which the liquid crystal is oriented homogeneously and preferably a second substrate on which the liquid crystal is oriented homeotropically.

18 Claims, No Drawings

LIQUID CRYSTALLINE MEDIUM AND LIQUID CRYSTAL DISPLAY

FIELD OF THE INVENTION

The present invention relates to liquid crystal displays exploiting the flexoelectric effect in chiral nematic liquid crystals and in particular to the method of orientation of the liquid crystal materials for operation in the uniformly lying helix mode.

BACKGROUND OF THE INVENTION

Liquid Crystal Displays (LCDs) are widely used to display information. Electro-optical modes employed are, e.g., the twisted nematic (TN)-, the super twisted nematic (STN)-, the optically compensated bend(OCB)- and the electrically controlled birefringence (ECB)-mode with their various modifications, as well as others. Besides these modes, which all use an electrical field which is substantially perpendicular to the substrates, respectively to the liquid crystal layer, there are also electro-optical modes employing an electrical field substantially parallel to the substrates, respectively the liquid crystal layer, like, e.g., the In-Plane Switching(IPS) mode, as disclosed, e.g., in DE 40 00 451 and EP 0 588 568. Especially this electro-optical mode is used for LCDs for modern desk top monitors. In IPS displays, like in Ferroelectric Liquid Crystal Displays (FLCDs), the liquid crystals are switching their axis of preferred orientation in the plane of the display. Thus there is almost no birefringence change during switching and consequently the optical effect is color neutral.

Displays using the flexoelectric effect in cholesteric liquid crystals in the Uniformly Lying Helix texture have been proposed (Phys. Rev. Lett. 58 (15), p. 1538–1540 (1987)). Throughout this application the terms chiral nematic and cholesteric are used synonymously, unless explicitly stated otherwise. The flexoelectric effect itself is known from Meyer (Phys. Rev. Lett. 22, p. 918 ff (1969)) and has more recently been reviewed by Rudquist et al. (Liq. Cryst. 22 (4), 445–449 (1997).

Liquid crystal compositions with short cholesteric pitch for flexoelectric devices are known from EP 0 971 016, GB 2 356 629 and Coles et al., J. Mater. Chem., 11, p. 2709–2716 (2001). EP 0 971 016 teaches mesogenic estradiols, which, as such, have a high flexoelectric coefficient. GB 2 356 629 teaches bimesogenic compounds and their use in flexoelectric devices.

SUMMARY OF THE INVENTION

In the uniform lying helix (ULH) texture a cholesteric liquid crystal with a short pitch is unidirectionally aligned with its helical axis parallel to the substrates, e.g. glass plates, of a liquid crystal cell. The helical axis of the cholesteric liquid crystal is equivalent to the optical axis of a birefringent plate. The uniformly lying helix texture generally is realized using a chiral nematic liquid crystal with a short pitch, preferably in the range from 0.2 µm to 1.0 µm, more preferably of 1.0 µm or less, in particular of 0.5 µm or less.

If an electrical field is applied to electrodes on the substrates, preferably on their inner surfaces, in this configuration, i.e., normal to the helical axis, the optical axis is rotated in the plane of the cell. This rotation is similar to the rotation of the director of a ferroelectric liquid crystal in a surface stabilized ferroelectric liquid crystal display. The flexoelectric effect is characterized by fast response times, typically in the range from 60 µs to 100 µs. It further features excellent grey scale capability.

The electric field can be seen to essentially couple flexoelectrically to the induced splay-bend deformation of the director. The angle of the rotation of the axis, in first approximation, is directly and linearly proportional to the strength of the electrical field. The optical effect can be observed best, when the liquid crystal cell is placed between crossed polarizers with the optical axis in the unpowered state at an angle of 22.5° to the absorption axis of one of the polarizers. This angle of 22.5° also is the ideal angle of rotation of the of the helical axis with the electric field, as thus, by the inversion the electrical field, the optical axis is rotated by 45° and by appropriate selection of the relative orientations of the preferred direction of the axis of the helix, the absorption axis of the polarizer and the direction of the electric field, the optical axis can be switched from parallel to one polarizer to the center angle between both polarizers. The optimum contrast is achieved when the total angle of the switching of the optical axis is 45°. In that case the arrangement can be used as a switchable quarter wave plate, provided the optical retardation, i.e. the product of the effective birefringence of the liquid crystal and the cell gap, is selected to be the quarter of the wavelength. In this context the wavelength referred to is 550 nm, the wavelength for which the sensitivity of the human eye is highest, unless explicitly stated otherwise.

The angle of rotation of the optical axis ($\phi$) is given in good approximation by formula (1).

$$\tan \phi = \bar{e} P_0 E/(2\pi K) \tag{1}$$

wherein $P_0$ is the undisturbed pitch of the cholesteric liquid crystal, $\bar{e}$ is the average [$\bar{e}=\frac{1}{2}(e_{splay}+e_{bend})$] of the splay flexoelectric coefficient ($e_{splay}$) and the bend flexoelectric coefficient ($e_{bend}$), E is the electrical field strength and K is the average [$K=\frac{1}{2}(k_{11}+k_{33})$] of the splay elastic constant ($k_{11}$) and the bend elastic constant ($k_{33}$)

and wherein the ratio $\bar{e}/K$ is called the flexo-elastic ratio.

This angle of rotation ($\phi$) is half the switching angle in a flexoelectric switching element.

The response time ($\tau$) of this electro-optical effect is given in good approximation by formula (2).

$$\tau = [P_0/(2\pi)]^2 \cdot \gamma/K \tag{2}$$

wherein $\gamma$ is the effective viscosity coefficient associated with the distortion of the helix.

There is a critical field ($E_c$) to unwind the helix, which can be obtained from equation (3).

$$E_c = (\pi^2/P_0) \cdot [k_{22}/(\epsilon_0 \cdot \Delta\epsilon)]^{1/2} \tag{3}$$

wherein $k_{22}$ is the twist elastic constant, $\epsilon_0$ is the permittivity of vacuum and $\Delta\epsilon$ is the dielectric anisotropy of the liquid crystal.

A chiral substance mixed with a nematic material induces a helical twist transforming the material into a chiral nematic material, which is equivalent to a cholesteric material. The terms chiral nematic and cholesteric are used synonymously in this application, unless explicitly stated otherwise. One difference between a cholesteric pure material and a chiral nematic mixture, however, is the fact, that the cholesteric pitch of the latter can be varied over a rather large range with comparative ease. The pitch induced by the chiral substance is in a first approximation inversely proportional to the concentration of the chiral material used. The constant of proportionality of this relation is called the helical twisting power (HTP) of the chiral substance and defined by equation (4)

$$HTP \equiv 1/(c \cdot P_0) \qquad (4)$$

wherein
c is concentration of the chiral compound.

For these displays new liquid crystalline media with improved properties are required. Especially the birefingence ($\Delta n$) should be optimized for the optical mode, i.e., the optical retardation (d·$\Delta n$) should be preferably such that the equation (5)

$$\sin^2(\pi \cdot d \cdot \Delta n/\lambda) = 1 \qquad (5)$$

wherein
d is the cell gap and
$\lambda$ is the wavelength of light is satisfied. The allowance of deviation for the right hand side of equation (5) is +/−3%.

The wavelength of light generally referred to in this application is 550 nm, unless explicitly specified otherwise.

Flexoelectric displays using the ULH-mode, like in plane switching and ferroelectric displays, inherently have a black and white response with a very wide viewing angle. Thus, the color representation is almost independent of the angle of observation. This fact positively contrasts from the situation for displays exploiting birefringent effects, like TN, STN and ECB displays.

Compared to IPS displays, flexoelectric displays are characterized by their extremely fast response time, whereas compared to FLCDs, they are preferred, as they allow direct representation of grey scales, having a voltage dependent switching angle and are not showing bistable response as in the case of FLCDs.

However, so far, there has been a problem to achieve the orientation of the cholesteric liquid crystals in the uniaxially lying helix texture in a well reproducible way. Coles et al., J. Mater. Chem., 2001, 11, pp. 2709–2716, mentioned above, reports that monomesogenic liquid crystals containing a chiral additive, which exhibit blue phases promote the easy formation of the uniaxially lying helix texture. When such materials are enclosed in liquid crystal cells between two walls, at least one of which is provided with an alignment layer for planar alignment, they spontaneously form a uniformly lying helix texture upon application of an alternating electrical field across the material while it is in its blue phase. Subsequently the sample is cooled into the cholesteric phase under the applied field. In this case no mechanical manipulation, like shearing the liquid crystal sample, is required to obtain the uniform alignment. However, this reference only discloses cholesteric liquid crystal materials based on monomesogenic liquid crystal materials but does not even mention bimesogenic liquid crystals.

It further has been reported by Blatch et al., J. Mater. Chem., 1997, 7(1), pp. 9–17, that liquid crystal materials comprising bimesogenic liquid crystals with an odd number of atoms in the spacer group, which are further comprising a chiral center sufficient to achieve a helical pitch of 500 nm or less, do generally exhibit blue phases.

Thus, there is a significant need for liquid crystalline media with fast switching, i.e., small response times, for practical applications such as, e.g., computer monitors, screens for television sets and the like, displays for multi media applications, hand held tele-communication devices automatic teller machines and light modulators. They have to have a wide nematic phase range, low viscosities, a low $\Delta \epsilon$, high flexoelectric coefficients, a sufficiently high resistivity and, in particular, an appropriately optimized optical anisotropy, $\Delta n$, for a given cell thickness depending on the display mode used.

The liquid crystal displays according to the present invention are using the flexoelectric effect in chiral nematic devices that are oriented in the ULH texture. They are preferably used in displays or in electro-optical devices, like switches for light, or they are used, e.g., in optical components.

The cell gap of the cells preferably is in the range from 1 µm to 20 µm, in particular with in the range from 2.0 µm to 10 µm.

Preferably the displays according to the present invention are addressed by an active matrix, i.e., a matrix of active electrical elements with a nonlinear current-voltage characteristic. These active elements preferably are thin film transistors (TFTs). They can be used for direct view applications as well as for projection type displays. However, the inventive liquid crystals can also beneficially be used in displays with other known addressing means.

Surprisingly, it now has been found, that chiral nematic liquid crystalline media can be aligned in the ULH texture upon application of an alternating electrical field by using an intrinsically non-symmetric system.

This non-symmetry can be introduced into the system in the following ways for example. In a first preferred embodiment the inner surfaces of the substrates of the display are treated to align liquid crystals in a hybrid alignment. This means that one surface induces planar alignment, also called homogeneous alignment, whereas the other surface induces homeotropic alignment. Obviously in both alignments the liquid crystals may exhibit a finite surface tilt angle. Non-symmetry can also be introduced by using non-symmetric compounds.

These displays according to the present invention do not exhibit the drawbacks of the displays of the prior art or at least exhibit them to a significantly lesser degree.

Preferably the liquid crystalline materials used in the displays according to the present invention have an induced chiral nematic phase.

The base mixtures of the liquid crystalline media preferably have a positive dielectric anisotropy, in order to further the alignment of the axis of the helix in the plane of the cell. However, at the same time, the dielectric anisotropy of the base mixture should be limited, as otherwise there would be an undesired dielectric unwinding of the helix upon application of the electrical field instead of the desired flexoelectric switching of the axis of the helix.

The dielectric anisotropy of the liquid crystalline mixture preferably is in the range from 0 or more to 10 or less and in particular from 0.1 or more to 5 or less.

The unwinding voltage for the helical structure of the mixture is preferably 30V or more, more preferably 50V or more for a 5 µm thick cell at the operating temperature.

The switching angle for the liquid crystalline mixture is preferably 5° or more, more preferably 10° or more, particularly preferably 15° or more, and especially 22.5° for a voltage of typically 10V or more, for 5 µm cell thickness, at the operating temperature.

The improved liquid crystalline displays according to the instant application fulfill the following conditions. They comprise
- a pair of substrates
  - each bearing one or more electrodes and
  - at least one of them bearing an orientation layer for planar alignment of liquid crystals or being otherwise treated for planar orientation of liquid crystals,
- a cholesteric liquid crystal material comprising
  - a component A, comprising one or more bimesogenic compounds with an odd or even, preferably odd number of atoms in a spacer group between the two mesogenic units and with a non-symmetric structure,
  - a chiral component, component B, comprising one or more compounds, wherein the cholesteric liquid crystal material is aligned in a uniformly lying helix structure with a helical pitch preferably lower than 500 nm, more preferably lower than 400 nm, most preferably lower than 300 run or less and are characterized in that the following conditions are satisfied
- at least one substrate has an orientation layer for planar alignment of liquid crystals or being otherwise treated for planar alignment of liquid crystals, and the other substrate can have either homogeneous or homeotropic alignment.

Preferably the bimesogenic component, component A comprises one or more compounds selected from those of the formulae I-1 to I-3

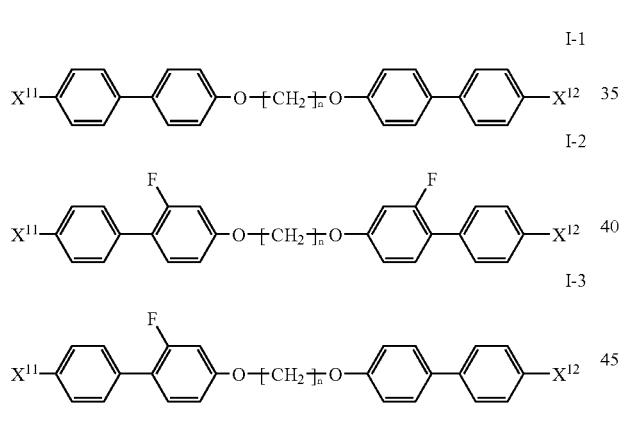

wherein
$X^{11}$ and $X^{12}$, independently of each other are CN, F, Cl or fluorinated alkyl or fluorinated alkoxy, each with 1 to 4 C-atoms, preferably CN, F or Cl, most preferably CN or F, with the condition that, in formulae I-1 and I-2, $X^{11}$ and $X^{12}$ are different from each other, and
n is an odd integer in the range from 3 to 17, preferably from 5 to 13.

Optionally the bimesogenic component, component A further comprises one or more compounds selected from those of the formulae I'-1 to I'-3, which are almost identical with the respective formulae I-1 to I-3 given above, wherein the parameters have the meanings given above, which, however are different in that $X^{11}$ and $X^{12}$ are identical in formulae I'-1 and I'-2 and/or n is an even integer in the range from 2 to 18.

Preferably the bimesogenic component, component A further comprises one or more compounds of formula IIa, preferably one or more compounds each of at least two different formulae selected from those of the formulae II'-1 and II'-2

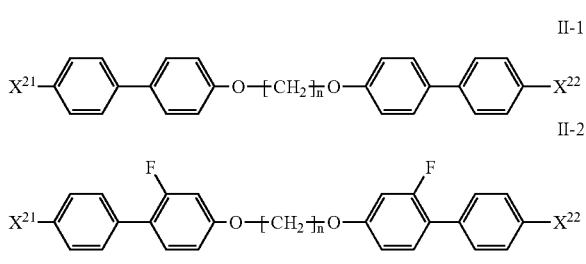

wherein
$X^{21}$ and $X^{22}$, have the meaning given for $X^{11}$ and $X^{12}$ under formulae I'-1 to I'3 above and
n is an integer in the range from 2 to 18.

Preferably the chiral component, component B, comprises one or more compounds of formula III

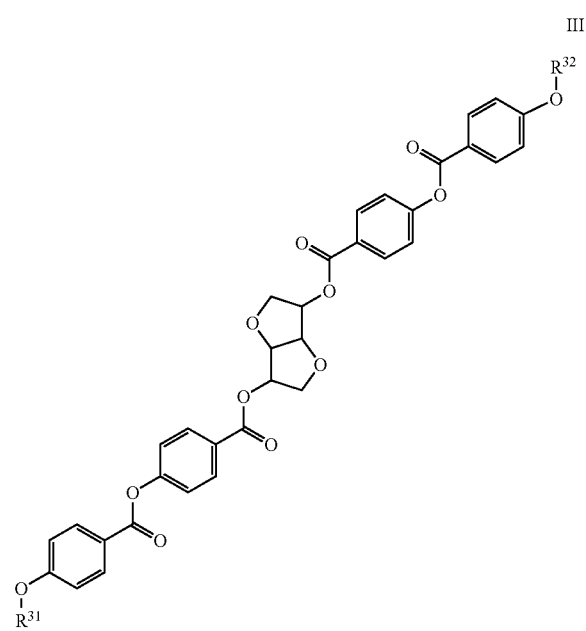

wherein
$R^{31}$ and $R^{32}$, independently of each other are alkyl or alkoxy, each with 1 to 17 C-atoms or alkenyl, alkenyloxy or oxaalkyl, each with 2 to 17 C-atoms, all of which optionally may be fluorinated, preferably $R^{31}$ and $R^{32}$ are identical to each other and most preferably they are n-alkyl, one or more of the phenyl rings optionally may be fluorinated.

The improved liquid crystalline displays according to a preferred embodiment of the instant invention comprise a chiral component (component B) which induces a cholesteric pitch of the liquid crystal material of 500 nm or less, preferably of 450 nm or less and especially preferred of 400 nm or less.

In a further preferred embodiment of the instant invention, which may be different from the embodiment described above, the alternating electrical field applied to align the liquid crystal material is preferably lower than the critical field for helix unwinding. For practical reasons it is preferably 12 V/m or less and most preferably 4 V/m or less.

In a further preferred embodiment of the instant invention, which may be different from the embodiments described above, a liquid crystal cell with surfaces treated for planar alignment is used. In this embodiment the preferred starting condition for the orientation of the liquid crystal material is the Grandjean texture. In this embodiment, which is independent from the two previous embodiments, the strength of the aligning field is applied, ramped up and/or increased gradually at the critical field only for the helix unwinding. This allows for true homeotropic alignment in case the liquid crystal material has a positive dielectric anisotropy, which is generally preferred in this application and especially in the instant embodiment. Then the aligning field is decreased gradually from its maximum value, preferably the critical field, until a good uniform lying helix alignment is achieved, over a defined time span. This time span preferably is in the range of 1 second to 2 hours, more preferably in the range of 1 second to 600 seconds and most preferably in the range from 1 second to 60 seconds. For reasons of productivity, the time span should be as short as possible, while a sufficient time has to be allowed to ensure proper orientation.

A sweeping speed of 20 V/(µm·min) has been found useful in most cases.

The chiral nematic phase of the liquid crystal materials used for the invention preferably extends over a range of 10 degrees centigrade or more, preferably over a range of 20 degrees centigrade or more and most preferably over a range 30 degrees centigrade or more The sequence of textures typically observed in a sample of an inventive medium upon application of an electric field is as follows:

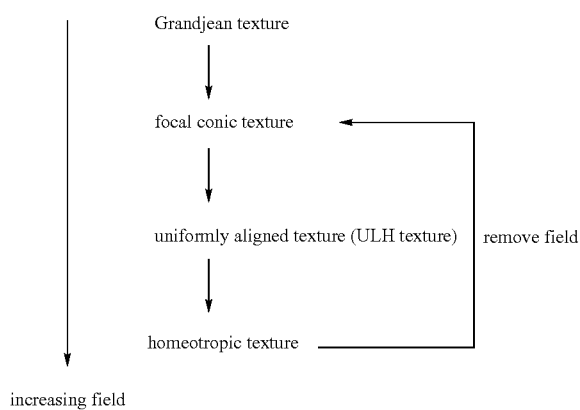

Scheme 1: Phase sequence during orientation

Comprising in this application means in the context of compositions that the entity referred to, e.g., the medium or the component, contains the component or components or of the compound or compounds in question, preferably in a total concentration of 10% or more and most preferably of 20% or more.

Predominantly consisting, in this context, means that the entity referred to contains 80% or more, preferably 90% or more and most preferably 95% or more of the component or components or of the compound or compounds in question.

Entirely consisting, in this context, means that the entity referred to contains 98% or more, preferably 99% or more and most preferably 100.0% of the component or components or of the compound or compounds in question.

Also other mesogenic, as well as nonmesogenic, compounds, which are not explicitly mentioned above, can optionally and in certain cases beneficially be used in the media according to the instant invention. Such compounds are known to the expert in the field.

Component A preferably is used in a concentration from 90% to 99.9%, preferably from 90% to 95%.

Component B preferably is used in a concentration from 0.1% to 10%, preferably from 0.1% to 5% of the total mixture.

Optionally, the media to be used in the inventive displays can comprise further liquid crystal compounds in order to adjust the physical properties. Such compounds are known to the expert. Their concentration in the media according to the instant invention is preferably 0% to 99.9%.

Preferably the liquid crystal medium to be used according to the present invention contains 50% to 100%, more preferably 70% to 100% and most preferably 80% to 100% and in particular 90% to 100% totally of components A and B, which contain, preferably predominantly consist of and most preferably entirely consist of one or more of compounds of formulae I-1 to I-3, I'-1 to I'-3, II-1, II-2 and III, respectively.

The $\Delta n$ of the liquid crystal media to be used according to the instant invention is preferably 0.215 or more, more preferably in the range of 0.100 to 0.300.

The $\Delta \in$, at 1 kHz and 20° C., of the liquid crystal media to be used according to the invention is preferably 0 or more, more preferably 5 or more and preferably 12 or less.

The liquid crystal media to be used according to the instant invention are preferably characterized by clearing points of between 100° C. and 150° C. or even more.

The nematic phase of the liquid crystal media to be used according to the instant do preferably extend to less than 20° C. or less, more preferably 15° C. or less, most preferably 10° C. or less, especially 5° C. or less.

Preferably the nematic phase of the media to be used in the inventive displays extends at least from −50° C. to 100° C., wherein at least means that preferably the lower limit is under cut, wherein the upper limit is surpassed.

In the present application the term dielectrically positive compounds describes compounds with $\Delta \in > 3.0$, dielectrically neutral compounds are compounds with $-1.5 \leq \Delta \in \leq 3.0$ and dielectrically negative compounds are compounds with $\Delta \in < -1.5$. The same holds for components. $\Delta \in$ is determined at 1 kHz and 20° C. The dielectrical anisotropies of the compounds are determined from the results of a solution of 10% of the individual compounds in a nematic host mixture. The capacities of these test mixtures are determined both in a cell with homeotropic and with homogeneous alignment. The cell gap of both types of cells is approximately 10 µm. The voltage applied is a rectangular wave with a frequency of 1 kHz and a root mean square value typically of 0.5 V to 1.0 V. However, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%. Components having a nematic phase at the measurement temperature of 20° C. are measured as such. All others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. The two expressions, room temperature and ambient temperature both refer to a temperature of 20° C., unless explicitly stated otherwise. All physical properties have been and are determined according to "Merck Liquid Crystals, Physical Properties of Liquid Crystals", Status November 1997, Merck KGaA, Germany and are given for a temperature of 20° C., unless explicitly stated otherwise. The properties of the flexoelectric materials are given at a temperature of 10 degrees centigrade below the clearing temperature of the respective material. The optical anisotropy ($\Delta n$) is determined at a wavelength of 589.3 nm. The dielectric anisotropy ($\Delta\epsilon$) is determined at a frequency of 1 kHz. The threshold voltages, as well as all other electro-optical properties, have been determined with test cells prepared at EEV, UK. The test cells for the determination of $\Delta\epsilon$ had a cell gap of 22 μm. The electrode was a circular ITO electrode with an area of 1.13 cm$^2$ and a guard ring. The orientation layers were lecithin for homeotropic orientation ($\epsilon_\parallel$) and polyimide AL-1054 from Japan Synthetic Rubber for homogeneous orientation ($\epsilon_\perp$). The capacities were determined with a frequency response analyzer Solatron 1260 using a sine wave with a voltage of 0.3 $V_{rms}$. The light used in the electro-optical measurements was white light. The set up used was a commercially available equipment of Otsuka, Japan. The characteristic voltages have been determined under perpendicular observation. The threshold ($V_{10}$)—mid grey ($V_{50}$)—and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention consist of a plurality of compounds, preferably of 3 to 30, more preferably of 8 to 20 and most preferably of 10 to 16 compounds.

These compounds are mixed in conventional way. Generally, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e. g. using so called premixtures, which can be e.g. homologous or eutectic mixtures of compounds or using so called multi-bottle-systems, the constituents of which are ready to use mixtures themselves.

The orientation of the liquid crystal media according to the present invention in the inventive cells is typically achieved by treating the major inner surfaces of the cell opposing each other with an aligning means for homogeneous alignment and application of an electrical field to the filled cell. The means for homeotropic orientation is an inorganic layer with a preferred direction, like, e.g., obliquely evaporated $SiO_x$ or an organic layer, typically a polymeric layer, having a preferred direction, like a unidirectionally rubbed polyimide or polyamide film.

The melting point T(C,N), the transition from the smectic (S) to the nematic (N) phase T(S,N) and the clearing point T (N,I) of the liquid crystals are given in degrees centigrade.

In the present application and especially in the following examples, the structures of the liquid crystal compounds are represented by abbreviations also called acronyms. The transformation of the abbreviations into the corresponding structures is straight forward according to the following table A. All groups $C_nH_{2n+1}$, and $C_mH_{2m+1}$ are straight chain alkyl groups with n respectively m C-atoms.

TABLE A

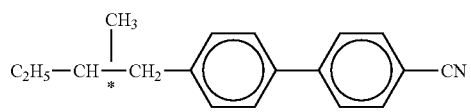

CB15

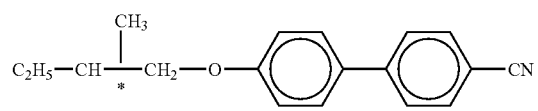

C15

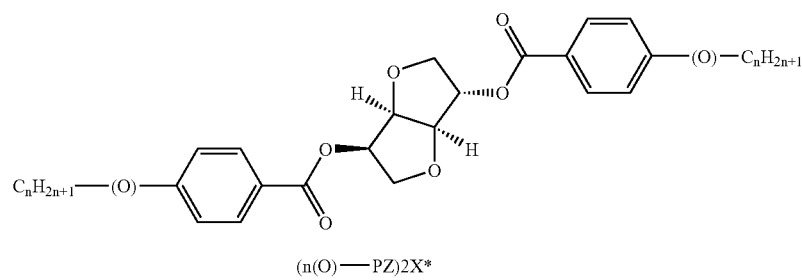

(n(O)—PZ)2X*

TABLE A-continued

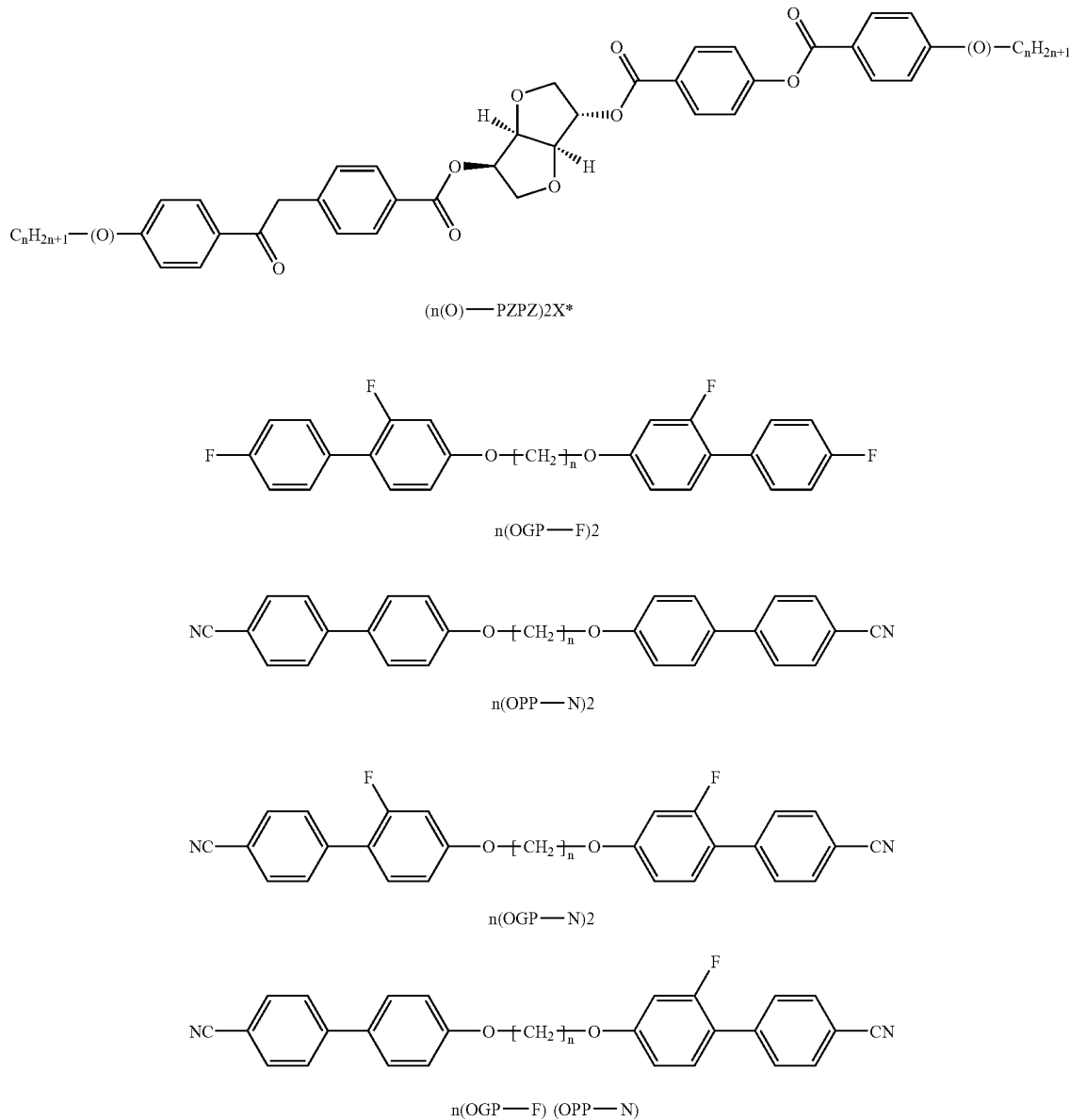

The liquid crystal media according to the instant invention contain preferably
two or more, preferably three or more compounds, preferably of at least two, preferably three, different formulae, selected from the group of compounds of formulae of table A.

The entire disclosures of all applications, patents and publications, cited herein and of corresponding European application No. 02022328.5, filed Oct. 8, 2002 is incorporated by reference herein.

EXAMPLES

The examples given in the following are intended to illustrate the present invention without limiting its scope in any way.

However, they illustrate typical preferred embodiments. They show the use of typical and preferred constituents and exemplarily illustrate their concentrations. Further, they show possible variations of the physical properties of the products and devices, illustrating to the expert which properties can be achieved and in which ranges they can be modified. Especially they show the expert the combination of the various properties that can be preferably achieved.

Examples 1 to 5

In examples 1 to 4 four liquid crystalline compounds were doped each with 3.5%, respectively 3.75%, of the chiral compound (1O-PZPZ)$_2$X*, see the table below (table 1). A binary mixture of two of these compounds, 52% of the second and 48% of the third compound, was also prepared and doped with 3.5% of the same chiral compound (example 5). The compositions of the five final mixtures are given in the following table.

TABLE 1

Compositions of cholesteric compositions

| Compound | N—PP—OnO—GP—F | | | | |
|---|---|---|---|---|---|
| n | 5 | 7 | 9 | 11 | (1O—PZPZ)$_2$X* |
| Example No. | | | c/% | | |
| 1 | 96.5 | —/— | —/— | —/— | 3.5 |
| 2 | —/— | 96.5 | —/— | —/— | 3.5 |
| 3 | —/— | —/— | 96.25 | —/— | 3.75 |
| 4 | —/— | —/— | —/— | 96.5 | 3.5 |
| 5 | —/— | 50.18 | 46.32 | —/— | 3.5 |

The phase ranges of all of these five liquid crystal materials were determined using a differential scanning calorimeter in the heating run. The materials of examples 1 and 2 did exhibit blue phases. The results are listed in table 2 below together with the other physical properties.

TABLE 2

Physical properties of cholesteric compositions

| Example No. | Phase sequence T(i, j)/° C. | Pitch/nm | Alignment by electrical field | $E_c$/V/μm |
|---|---|---|---|---|
| 1+ | C 93 N* 106 I | 264 | Yes | 10.8 |
| 2+ | C 96 N* 114 I | 292 | Yes | 15.3 |
| 3+ | C 74 N* 111 I | 290 | Yes | 17.9 |
| 4+ | C 73 N* 112 I | 321 | Yes | 15.2 |
| 5 | C n.d. N* 114 I | 364 | Yes | 10.8 |

Remarks:
X* chiral group X;
N* chiral nematic phase;
+shows blue phase;
C crystalline phase;
I isotropic phase;
n.d. not determined.

Next, the cholesteric pitch ($P_0$) of the materials was determined by the method of selective reflection (calculated from the wavelength of the maximum of the selective reflection ($\lambda_r$) by equation (6)

$$P_0 = 2\lambda_r(n_e + n_o)) \quad (6)$$

with an estimated accuracy of P=+/−5 nm at a temperature of 10 degrees below the clearing point of the material.

Then all of these five liquid crystal materials were introduced into standard anti-parallel aligned cells supplied by EEV, UK having a thickness in the range from 4 μm to 7 μm.

Their orientation behavior upon application of an alternating electrical field, with field strengths in the range of 0 $V_{rms}$ to 100 $V_{rms}$, was investigated and all samples were found easy to orient in the cholesteric phase. Subsequently the critical field for unwinding of the cholesteric helix was determined at a temperature of 10 degrees Centigrade below the clearing point.

Comparative Example

A mixture of 96.5% of 10(OGP-F)$_2$ with 3.5% of (10-PZPZ)$_2$X* was prepared. The resulting mixture has a phase sequence of Cr 113 N* 133 I. The cholesteric pitch was 420 nm. This mixture could not be aligned by application of an electric field only. It could be aligned by additional mechanical shearing. The critical field $E_c$ was 13.8 V/μm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystal display comprising
    a first and second substrate
        each substrate bearing one or more electrodes and
        the first substrate bearing an orientation layer for planar alignment of liquid crystals or being otherwise treated for planar orientation of liquid crystals,
        the second substrate having either homogeneous or homeotropic alignment.
    a cholesteric liquid crystal material comprising
        a component A, comprising one or more bimesogenic compounds with an odd number of atoms in the spacer group between the two mesogenic units and with a non-symmetric structure,
        a chiral component B comprising one or more compounds, wherein
        the cholesteric liquid crystal material is aligned in a uniformly lying helix structure with a helical pitch of 400 nm or less.

2. The liquid crystal display according to claim 1, wherein the liquid crystal material exhibits a blue phase.

3. The liquid crystal display according to claim 1, wherein the concentration of the component B in the liquid crystal material is 1% or more.

4. The liquid crystal display according to claim 2, wherein the concentration of the component B in the liquid crystal material is 1% or more.

5. A liquid crystal display according to claim 1, wherein the second substrate has homeotropic alignment to give the liquid crystal material a hybrid alignment.

6. A liquid crystal display according to claim 2, wherein the second substrate has homeotropic alignment to give the liquid crystal material a hybrid alignment.

7. A liquid crystal display according to claim 1, wherein the orientation of the liquid crystal material in the uniformly lying helix texture is achieved by application of an alternating electrical field.

8. A liquid crystal display according to claim 2, wherein the orientation of the liquid crystal material in the uniformly lying helix texture is achieved by application of an alternating electrical field.

9. A liquid crystal display according to claim 8, wherein the orientation of the liquid crystal material in the uniformly lying helix texture is achieved by application of an alternating electrical field at a temperature at which the liquid crystal material is in the blue phase.

10. A liquid crystal display according to claim 1, wherein the display is a display for video images.

11. A liquid crystal display according to claim 2, wherein the display is a display for video images.

12. A cholesteric liquid crystal material comprising
    a component A, comprising one or more bimesogenic compounds with an odd number of atoms in the spacer group between the two mesogenic units and with a non-symmetne structure,
    a chiral component B comprising one or more compounds, wherein
    the cholesteric liquid crystal material is aligned in a uniformly lying helix structure with a helical pitch of 400 nm or less.

13. The liquid crystal material of claim 12, wherein the material exhibits a blue phase.

14. The liquid crystal display of claim 1, wherein the second substrate has homeotropic alignment.

15. The liquid crystal display of claim 2, wherein the second substrate has homeotropic alignment.

16. The liquid crystal display of claim 1, wherein the cholesteric liquid crystal material comprises more than one bimesogenic compound with an odd number of atoms in the spacer group between the two mesogenic units and with a non-symmetric structure.

17. The liquid crystal display of claim 1, wherein component A comprises one or more compounds selected from those of the formulae I-1 to I-3:

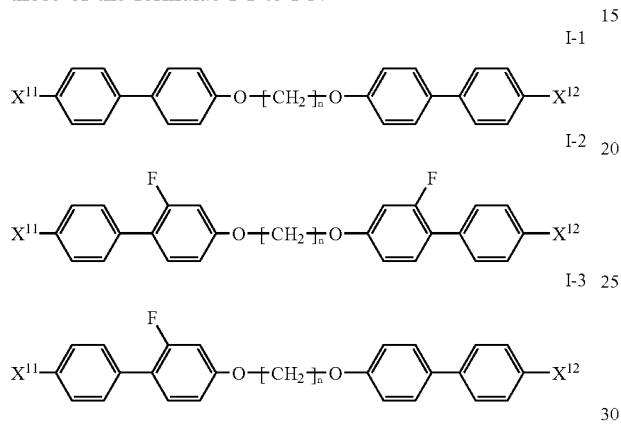

wherein
$X^{11}$ and $X^{12}$, independently of each other are CN, F, Cl or fluorinated alkyl or fluorinated alkoxy, each with 1 to 4 C-atoms, provided that, in formulae I-1 and I-2, $X^{11}$ and $X^{12}$ are different from each other, and
n is an odd integer in the range from 3 to 17.

18. The liquid crystal display of claim 1, wherein component B, comprises one or more compounds of formula III

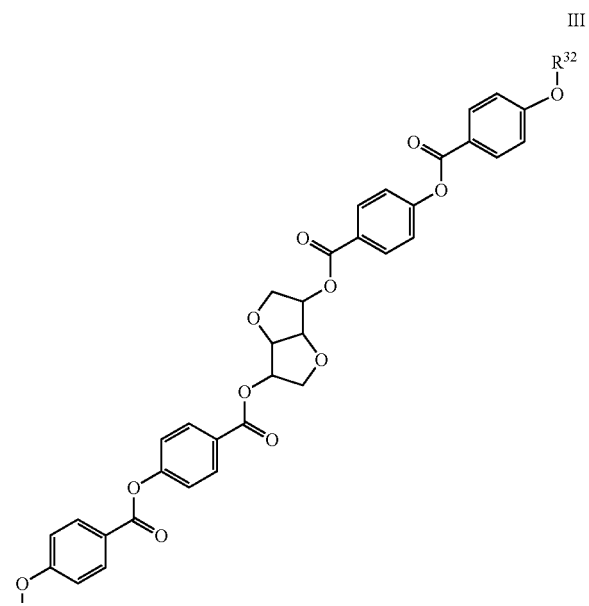

wherein $R^{31}$ and $R^{32}$, independently of each other are alkyl or alkoxy, each with 1 to 17 C-atoms or alkenyl, alkenyloxy or oxaalkyl, each with 2 to 17 C-atoms, all of which are optionally fluorinated and wherein one or more of the phenyl rings are optionally fluorinated.

* * * * *

UNITED STATES PATENT AND TRADEMARK OFFICE
CERTIFICATE OF CORRECTION

PATENT NO.         : 7,041,348 B2                                               Page 1 of 1
APPLICATION NO. : 10/680415
DATED              : May 9, 2006
INVENTOR(S)        : Doina Ionescu It is certified that error appears in the above-identified patent and that said Letters Patent is hereby corrected as shown below:

Column 14, line 63 reads "non-symmetne" should read -- non-symmetric --

Signed and Sealed this

Sixth Day of February, 2007

JON W. DUDAS
*Director of the United States Patent and Trademark Office*